(12) United States Patent
Gokhale

(10) Patent No.: US 11,670,755 B2
(45) Date of Patent: Jun. 6, 2023

(54) MODIFIED ELECTROLYTE-ANODE INTERFACE FOR SOLID-STATE LITHIUM BATTERIES

(71) Applicant: Nissan North America, Inc., Franklin, TN (US)

(72) Inventor: Rohan Gokhale, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 320 days.

(21) Appl. No.: 16/798,548

(22) Filed: Feb. 24, 2020

(65) Prior Publication Data

US 2021/0265618 A1    Aug. 26, 2021

(51) Int. Cl.
```
H01M 10/0562    (2010.01)
H01M 4/133      (2010.01)
H01M 10/0525    (2010.01)
H01M 4/583      (2010.01)
H01M 4/70       (2006.01)
H01M 4/02       (2006.01)
H01M 4/587      (2010.01)
H01M 4/80       (2006.01)
```

(52) U.S. Cl.
CPC .......... *H01M 4/133* (2013.01); *H01M 4/583* (2013.01); *H01M 4/70* (2013.01); *H01M 10/0525* (2013.01); *H01M 10/0562* (2013.01); *H01M 4/587* (2013.01); *H01M 4/808* (2013.01); *H01M 2004/028* (2013.01); *H01M 2300/0065* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 7,008,722 B2 | 3/2006 | Huang | |
| 8,865,345 B1 | 10/2014 | Ramasubramanian et al. | |
| 2014/0287305 A1* | 9/2014 | Wachsman | H01M 10/054 429/211 |
| 2015/0037688 A1* | 2/2015 | Otsuka | H01M 10/0525 429/304 |
| 2016/0293946 A1* | 10/2016 | Ritter | H01M 10/0525 |
| 2018/0241079 A1* | 8/2018 | Duong | H01M 4/134 |
| 2019/0280338 A1* | 9/2019 | Read | H01M 4/383 |
| 2019/0305297 A1* | 10/2019 | Zhou | H01G 11/38 |
| 2020/0014059 A1* | 1/2020 | de Souza | H01M 4/525 |
| 2020/0153037 A1* | 5/2020 | Renna | B01J 6/008 |
| 2021/0135281 A1* | 5/2021 | Yokoyama | C01G 33/006 |

FOREIGN PATENT DOCUMENTS

JP    2013-232284    * 11/2013    ............. H01M 4/13

* cited by examiner

*Primary Examiner* — Jeremiah R Smith
(74) *Attorney, Agent, or Firm* — Young Basile Hanlon & MacFarlane, P.C.

(57) ABSTRACT

A solid-state battery cell includes a cathode, an anode, a solid-state electrolyte between the cathode and the anode, and an electrolyte-anode interfacial layer between the solid-state electrolyte and the anode. The electrolyte-anode interfacial layer comprises porous, high surface area carbon and nanostructures formed on an anode-facing surface of the solid-state electrolyte, wherein the nanostructures penetrate the porous, high surface area carbon.

18 Claims, 3 Drawing Sheets

MODIFIED ELECTROLYTE-ANODE INTERFACE FOR SOLID-STATE LITHIUM BATTERIES

TECHNICAL FIELD

This disclosure relates to solid-state lithium batteries having a modified electrolyte-anode interface.

BACKGROUND

Conventional lithium-ion batteries use a liquid electrolyte that requires additional space in each battery cell, can be flammable and can be prone to leaking. Solid-state lithium batteries have advantages over these conventional non-solid-state lithium-ion batteries, such as improved safety, operation over a wider temperature range and higher charge/discharge cycling rates. Solid-state lithium batteries can produce high volumetric and gravimetric energy densities. However, the interfacial contact between the solid electrolyte and the lithium metal anode can cause problems at the microstructural level. High interfacial impedance/resistance arises from limited contact surface area between the solid electrolyte and the active lithium material where lithium-ion transfer occurs, for example.

SUMMARY

Disclosed herein are implementations of a solid-state battery cell and batteries having multiple solid-state battery cells. One implementation of a solid-state battery cell as disclosed herein includes a cathode, an anode, a solid-state electrolyte between the cathode and the anode, and an electrolyte-anode interfacial layer between the solid-state electrolyte and the anode. The electrolyte-anode interfacial layer comprises porous, high surface area carbon and nanostructures formed on an anode-facing surface of the solid-state electrolyte, wherein the nanostructures penetrate the porous, high surface area carbon.

Another implementation of a solid-state battery cell as disclosed herein comprises a cathode, an anode comprising lithium metal, a solid-state electrolyte between the cathode and the anode, and an electrolyte-anode interfacial layer between the solid-state electrolyte and the anode. The electrolyte-anode interfacial layer comprises a layer of porous, high surface area carbon formed on an electrolyte-facing surface of the lithium metal, the porous, high surface area carbon coated with lithium metal. The electrolyte-anode interfacial layer also comprises nanostructures formed on an anode-facing surface of the solid-state electrolyte, the nanostructures penetrating the porous, the layer of high surface area carbon to form the electrolyte-anode interfacial layer. The nanostructures are nanoneedles or nanowires and are each vertically aligned with respect to a surface of the solid-state electrolyte.

Other implementations and aspects are described herein and otherwise contemplated.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

To reduce the high interfacial resistance arising from the limited contact surface area between the solid electrolyte and the anode active material where lithium-ion transfer occurs, embodiments of an electrolyte-anode interfacial layer are disclosed herein, as well as embodiments of solid-state battery cells incorporating the electrolyte-anode interfacial layer.

Figure 1A:
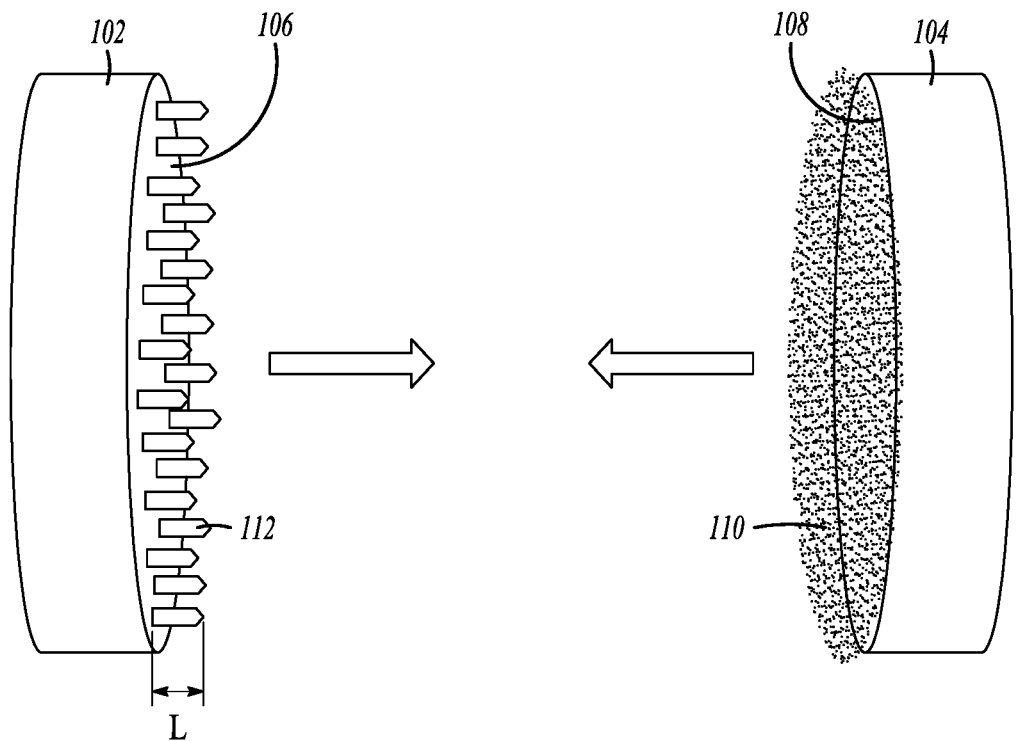
FIGS. 1A-1C illustrate the manufacture of an electrolyte-anode interfacial layer as disclosed herein.
Figure 1B:
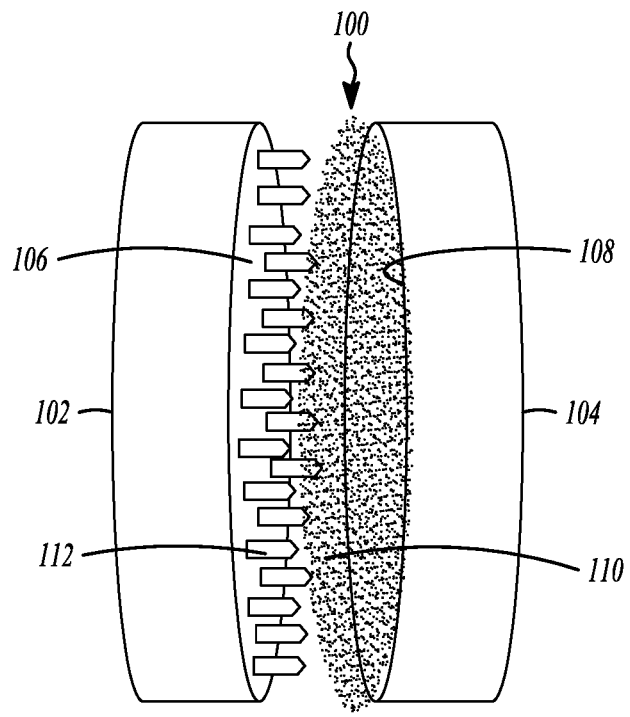
Figure 1C:
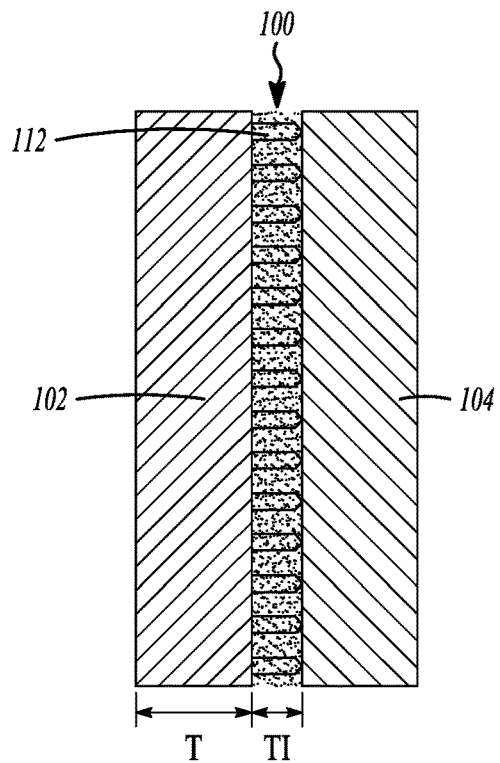

An electrolyte-anode interfacial layer as disclosed herein is illustrated in FIGS. 1A-1C. The electrolyte-anode interfacial layer 100 is sandwiched between a solid-state electrolyte 102 and an anode 104. The electrolyte-anode interfacial layer 100 comprises porous, high surface area carbon 110 and nanostructures 112 formed on an anode-facing surface 106 of the solid-state electrolyte 102. The nanostructures 112 penetrate the porous, high surface area carbon 110.

The solid-state electrolyte 102 is a solid material that enables the conduction of lithium ions. Such materials may be electrically insulating or ionic conducting. Examples of materials that can be employed as the solid-state electrolyte 102 include, but are not limited to, sulfide compounds (e.g. Argyrodite, LGPS, LPS, etc.), garnet structure oxides (e.g. LLZO with various dopants), NASICON-type phosphate glass ceramics (LAGP), oxynitrides (e.g. lithium phosphorus oxynitride or LIPON), and polymers (PEO).

The anode 104 is composed of anode material such as lithium metal or alloys including alloys of Si, Sn, Al, Ge, Pb, Bi, and Sb or other lithium compounds; and intercalation host materials, such as a carbon-based material.

The porous, high surface area carbon 110 has a surface area of greater than 500 $m^2/g$ and has a pore size distribution of between 5 nm and 50 nm. The porous, high surface area carbon 110 can be, as non-limiting examples, graphene or activated carbon.

The porous, high surface area carbon 110 can be coated with lithium metal using conventional deposition methods. Alternatively, the porous, high surface area carbon 110 can initially have no lithium metal coating, relying on lithium metal deposition occurring after the first charge.

In the embodiments in FIGS. 1A-1C, the porous, high surface area carbon 110 can be deposited on an electrolyte-facing surface 108 of the anode 104. In some embodiments, the porous, high surface area carbon 110 can be deposited directly onto an anode of lithium metal. In some embodiments, the porous, high surface area carbon 110 can be deposited directly onto an anode of an alloy or other lithium compound. In some embodiments, the porous, high surface area carbon 110 can be deposited onto an anode current collector if the anode is not pre-charged with lithium metal or other lithium anode materials.

The nanostructures 112 are formed on the anode-facing surface 106 of the solid-state electrolyte 102. The nano structures 112 can be formed on the anode-facing surface 106 with methods such as 3D printing and physical, chemical or electrochemical deposition methods known to those skilled in the art. The nanostructures 112 can be made from the same solid electrolyte material as the solid-state electrolyte 102. Alternatively, the nanostructures 112 can be made from a different solid electrolyte material than the material of the solid-state electrolyte 102.

The nanostructures 112 can be vertically aligned nanowires or vertically aligned nanoneedles. Nanoneedles have a tapered distal end while nanowires do not. Vertical alignment means that the nanostructures 112 are all essentially perpendicular to the anode-facing surface 106 of the solid-state electrolyte 102. The nanostructures can be between about 100 nm and 5.0 μm in length and between 10 nm and 100 nm in diameter. Each nanostructure 112 has a length L and the solid-state electrolyte 102 has a thickness T, a ratio of the length L of each nanostructure 112 to the thickness T of the solid-state electrolyte 102 being between $1.5 \times 10^{-5}:1$ and 0.25:1.

The nanostructures 112 and the porous, high surface area carbon 110 act as a hook and loop system leading to better adhesion between the solid-state electrolyte 102 and the anode 104. To better simulate the hook and loop structure, and to increase the interfacial contact between the solid-state electrolyte 102 and the anode 104, a density of the nanostructures 112 can be between 5,000 nanostructures/$\mu m^2$ and 50,000 nanostructures/$\mu m^2$. FIG. 1B illustrates the nanostructures 112 penetrating the porous, high surface area carbon 110 as the solid-state electrolyte 102 and the anode 104 are moved toward one another. FIG. 1C is a cross-sectional view of the solid-state electrolyte 102, the electrolyte-anode interfacial layer 100 and the anode 104. The thickness TI of the electrolyte-anode interfacial layer 100 is such that the porous, high surface area carbon 110 is not compressed and the nanostructures 112 have a length of about 80% to 100% of the thickness TI. In other words, the nanostructures 112 can penetrate the porous, high surface area carbon 110 until the nanostructures 112 contact the anode material, or can penetrate such that there is a gap between the nanostructures 112 and the anode material.

Figure 2:
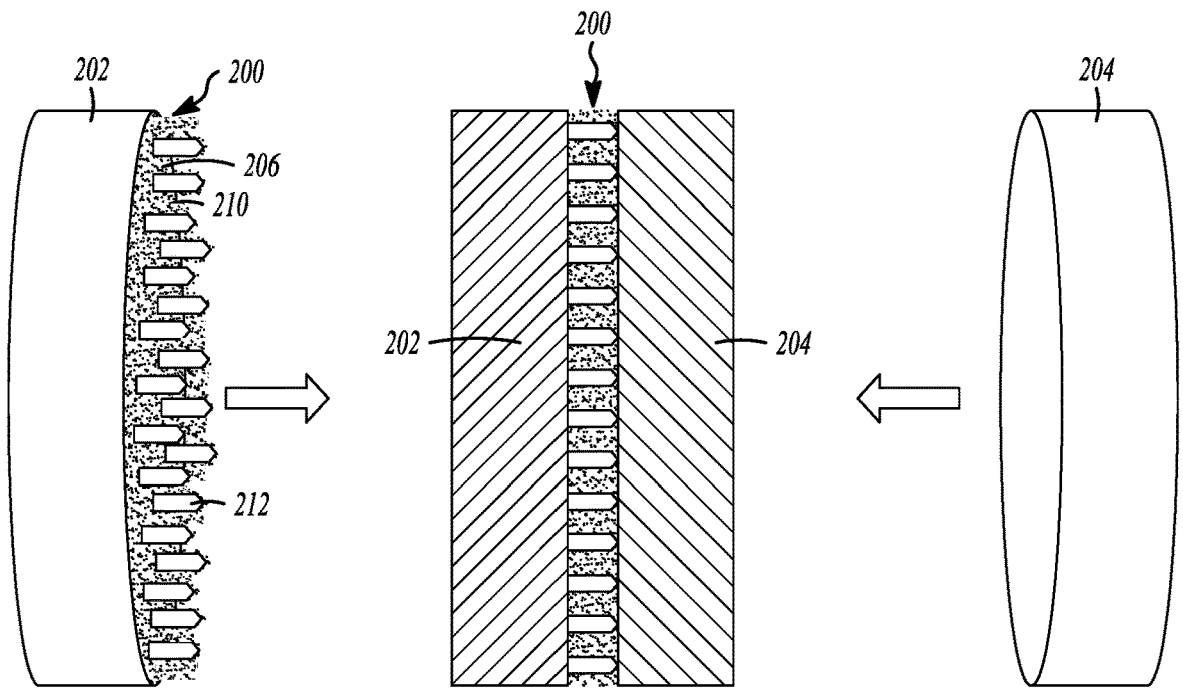
FIG. 2 illustrates another embodiment of an electrolyte-anode interfacial layer as disclosed herein.

FIG. 2 is another embodiment of an electrolyte-anode interfacial layer 200 as disclosed herein. In this embodiment, the solid-state electrolyte 202, the anode 204 and the nanostructures 212 are those similarly described with respect to FIGS. 1A-1C. However, the porous, high surface area carbon 210 is formed on the anode-facing surface 206 of the solid-state electrolyte 202 as a pillared network between the nanostructures 212. The pillared network can be formed with methods such as 3D printing and physical, chemical or electrochemical deposition methods known to those skilled in the art. The solid-state electrolyte 202 with the electrolyte-anode interfacial layer 200 is brought together with the anode 204 to promote better adhesion between the solid-state electrolyte 202 and the anode 204 and to increase the interfacial contact between the solid-state electrolyte 202 and the anode 204.

Figure 3:
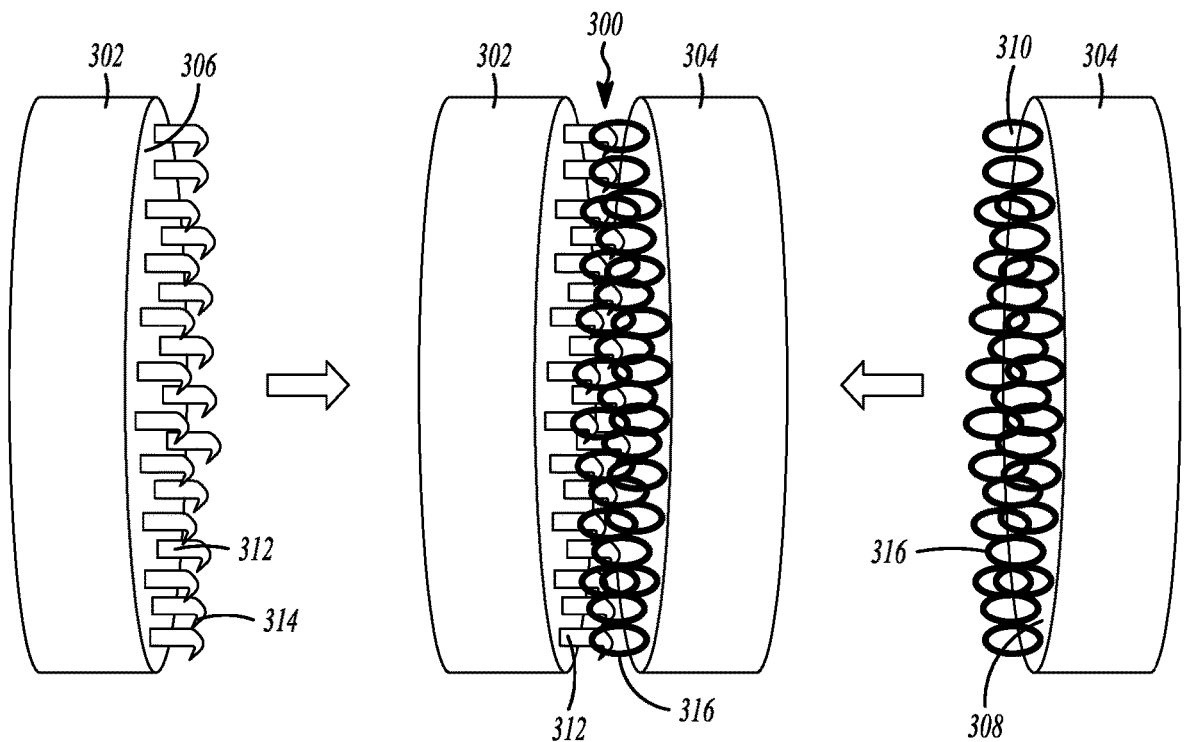
FIG. 3 illustrates another embodiment of an electrolyte-anode interfacial layer as disclosed herein.

FIG. 3 is another embodiment of an electrolyte-anode interfacial layer 300 as disclosed herein. In this embodiment, the solid-state electrolyte 302 and the anode 304 are those similarly described with respect to FIGS. 1A-1C. However, the nanostructures 312 are nanowires having a hooked distal end 314 and the porous, high surface area carbon 310 is formed in loop-like structures 316 as illustrated. The hooked distal end 314 can have any shape that will hook or snag on the loop-like structures 316. The nanostructures 312 and the loop-like structures 316 formed of the porous, high surface area carbon 310 can be formed with methods such as 3D printing and physical, chemical or electrochemical deposition methods known to those skilled in the art. The solid-state electrolyte 302 is brought together with the anode 304 to form the electrolyte-anode interfacial layer 300. The hooked distal end 316 and the loop-like structures 316 simulate the hook and look structure and promote better adhesion between the solid-state electrolyte 302 and the anode 304 and increase the interfacial contact between the solid-state electrolyte 302 and the anode 304.

An all solid-state battery cell incorporating embodiments of the electrolyte-anode interfacial layers disclosed herein may be configured, among other parts, with: (i) a thin metal cathode current collector, such as, for instance, 10 μm aluminum foil (or no such current collector if the cathode is conductive enough along its outside surface to which the positive terminal may be connected); (ii) a solid-state electrolyte, such as, for instance, 1-3 μm thick Lipon; and (iii) a thin metal anode, such as, for instance, 10-50 μm of metallic lithium. One or more elements may be fabricated into the solid-state battery cell by physical vapor deposition (PVD) processing or heat-pressure lamination. The elements of the solid-state battery cell may be, for example, packaged using a thin-film encapsulation of about 3 μm in thickness. A solid-state battery can have one or more solid-state battery cells.

Figure 4:
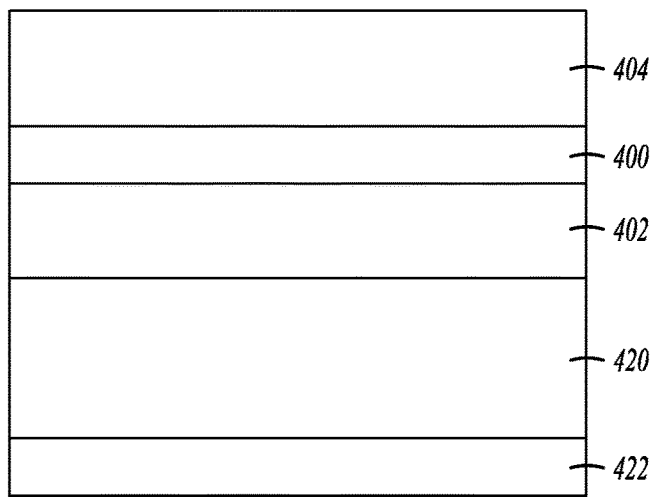
FIG. 4 is a side view of a solid-state battery cell having the electrolyte-anode interfacial layer as disclosed herein.

FIG. 4 is a side view of an example of a solid-state battery cell 10 having an electrolyte-anode interfacial layer 400 as disclosed herein as 100, 200, 300. The all solid-state lithium battery cell 10 in this example has a solid-state electrolyte 402, an anode 404, a cathode 420, a cathode current collector 422. The solid-state lithium battery cell 10 also includes the electrolyte-anode interfacial layer 400 disclosed herein. The layers can be sequentially deposited and can be encapsulated with an encapsulation material, not shown.

The cathode 420 comprises one or more electrochemically active cathode materials known for use in the solid-state battery, such as lithium-containing oxide (e.g., lithium cobalt oxide ($LiCoO_2$), lithium manganese oxide ($LiMnO_2$), lithium vanadium oxide ($LiVO_2$), lithium chromium oxide ($LiCrO_2$), lithium nickel oxide ($LiNiO_2$), lithium nickel cobalt aluminum oxide ($LiNiCoAlO_2$), and other transition metal oxides, or lithium iron phosphate ($LiFePO_4$)) and other similar materials.

Unless defined otherwise, all technical and scientific terms used herein have the same meanings as commonly understood by one of ordinary skill in the art to which this disclosure belongs. Preferred methods, techniques, devices and materials are described although any methods, techniques, devices, or materials similar or equivalent to those described may be used in the practice or testing of the present disclosure. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid-state battery cell, comprising:
a cathode;

an anode having anode active material of lithium metal;
a solid-state electrolyte between the cathode and the anode; and
an electrolyte-anode interfacial layer between the solid-state electrolyte and the anode active material, the electrolyte-anode interfacial layer comprising:
a porous, high surface area carbon; and
nanostructures formed on an anode-facing surface of the solid-state electrolyte, wherein the nanostructures penetrate the porous, high surface area carbon without penetrating the anode.

2. The solid-state battery cell of claim 1, wherein the porous, high surface area carbon has pores having a pore size between 5 nm and 50 nm.

3. The solid-state battery cell of claim 1, wherein the porous, high surface area carbon is formed as a pillared network between the nanostructures.

4. The solid-state battery cell of claim 1, wherein the nanostructures are nanoneedles or nanowires formed of a solid electrolyte material.

5. The solid-state battery cell of claim 4, wherein the solid-state electrolyte is the same solid electrolyte material as the nanostructures.

6. The solid-state battery cell of claim 4, wherein the solid-state electrolyte is a different solid electrolyte material from the solid electrolyte material of the nanostructures.

7. The solid-state battery cell of claim 1, wherein each nanostructure has a length and the solid-state electrolyte has a thickness, a ratio of the length of each nanostructure to the thickness of the solid-state electrolyte being between $1.5 \times 10^{-5}:1$ and $0.25:1$.

8. The solid-state battery cell of claim 1, wherein a density of the nanostructures is between 5,000 nanostructures/$\mu m^2$ and 50,000 nanostructures/$\mu m^2$.

9. The solid-state battery cell of claim 1, wherein the nanostructures are nanowires having a hooked distal end and the porous, high surface area carbon is formed in loop-like structures.

10. A solid-state battery cell, comprising:
a cathode;
an anode comprising lithium metal;
a solid-state electrolyte between the cathode and the anode; and
an electrolyte-anode interfacial layer between the solid-state electrolyte and the anode, the electrolyte-anode interfacial layer comprising:
a layer of porous, high surface area carbon formed on an electrolyte-facing surface of the lithium metal, the layer of porous, high surface area carbon having no lithium metal prior to charging; and
nanostructures formed on an anode-facing surface of the solid-state electrolyte, the nanostructures penetrating the layer of porous, high surface area carbon to form the electrolyte-anode interfacial layer, wherein the nanostructures are nanoneedles or nanowires and are each vertically aligned with respect to a surface of the solid-state electrolyte, wherein the nanostructures have a length between 80% and 100% a thickness of the electrolyte-anode interfacial layer.

11. The solid-state battery cell of claim 10, wherein the solid-state electrolyte is formed of a solid electrolyte material and the nanostructures are formed of the same solid electrolyte material.

12. The solid-state battery cell of claim 10, wherein the solid-state electrolyte is a different solid electrolyte material from a solid electrolyte material of the nanostructures.

13. The solid-state battery cell of claim 10, wherein each nanostructure has a length and the solid-state electrolyte has a thickness, a ratio of the length of each nanostructure to the thickness of the solid-state electrolyte being between $1.5 \times 10^{-5}:1$ and $0.25:1$.

14. The solid-state battery cell of claim 10, wherein a density of the nanostructures is between 5,000 nanostructures/$\mu m^2$ and 50,000 nanostructures/$\mu m^2$.

15. The solid-state battery cell of claim 10, wherein the porous, high surface area carbon has pores having a pore size between 5 nm and 50 nm.

16. The solid-state battery cell of claim 10, wherein a diameter of each nanostructure is between 10 nm and 100 nm.

17. The solid-state battery cell of claim 10, wherein the nanostructures are nanowires having a hooked distal end and the porous, high surface area carbon is formed in loop-like structures.

18. A solid-state battery cell, comprising:
a cathode;
an anode comprising lithium;
a solid-state electrolyte between the cathode and the anode; and
an electrolyte-anode interfacial layer between the solid-state electrolyte and the anode active material, the electrolyte-anode interfacial layer comprising:
a porous, high surface area carbon; and
nanostructures formed on an anode-facing surface of the solid-state electrolyte,
wherein the nanostructures penetrate the porous, high surface area carbon and are nanowires having a hooked distal end and the porous, high surface area carbon is formed in loop-like structures.

* * * * *